United States Patent
Hart et al.

(10) Patent No.: US 8,243,671 B2
(45) Date of Patent: Aug. 14, 2012

(54) DISTRIBUTED CHANNEL ASSIGNMENT

(75) Inventors: Brian Hart, Sunnyvale, CA (US);
Raghuram Rangarajan, Santa Clara, CA (US)

(73) Assignee: Cisco Technology, Inc., San Jose, CA (US)

( * ) Notice: Subject to any disclaimer, the term of this patent is extended or adjusted under 35 U.S.C. 154(b) by 517 days.

(21) Appl. No.: 12/556,875

(22) Filed: Sep. 10, 2009

(65) Prior Publication Data
US 2011/0058524 A1    Mar. 10, 2011

(51) Int. Cl.
*H04W 4/00* (2009.01)
(52) U.S. Cl. ............... 370/329; 370/341; 370/431
(58) Field of Classification Search .............. 370/310, 370/328, 329, 340, 341, 431, 437, 442, 443; 455/39, 500, 507, 509
See application file for complete search history.

(56) References Cited

U.S. PATENT DOCUMENTS

| | | | |
|---|---|---|---|
| 7,158,484 B1 * | 1/2007 | Ahmed et al. | 370/254 |
| 7,580,382 B1 * | 8/2009 | Amis et al. | 370/310 |
| 2008/0247412 A1 * | 10/2008 | Pak et al. | 370/431 |
| 2010/0232365 A1 * | 9/2010 | Lu et al. | 370/329 |
| 2011/0026441 A1 * | 2/2011 | Diener et al. | 370/260 |

* cited by examiner

*Primary Examiner* — Chi Pham
*Assistant Examiner* — Weibin Huang
(74) *Attorney, Agent, or Firm* — Tucker Ellis LLP

(57) ABSTRACT

Disclosed, in example embodiment herein, is an apparatus comprising an interface and channel selection logic coupled to the interface. The channel selection logic is operable to receive data representative of neighboring wireless devices to a wireless device occupying a channel for a plurality of channels via the interface. The channel selection logic is responsive to receiving the data representative of neighboring wireless devices occupying the plurality of channels to generate a graph for each of the plurality of channels, wherein vertices of the graph represent the wireless device and neighboring wireless devices occupying the channel and edges of the graph represent wireless devices with overlapping coverage areas. The channel selection logic selects the channel for the wireless device whose graph has the smallest radius.

20 Claims, 5 Drawing Sheets

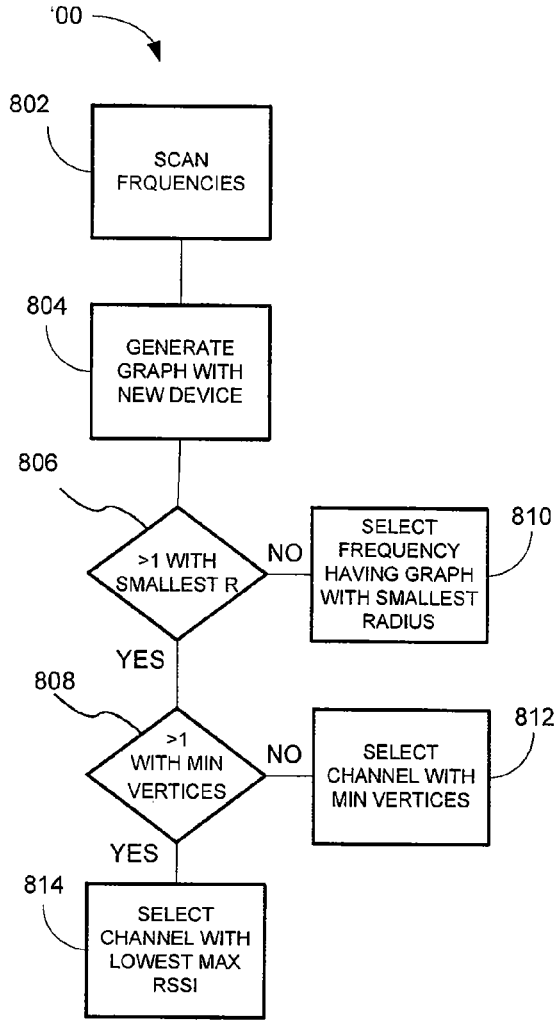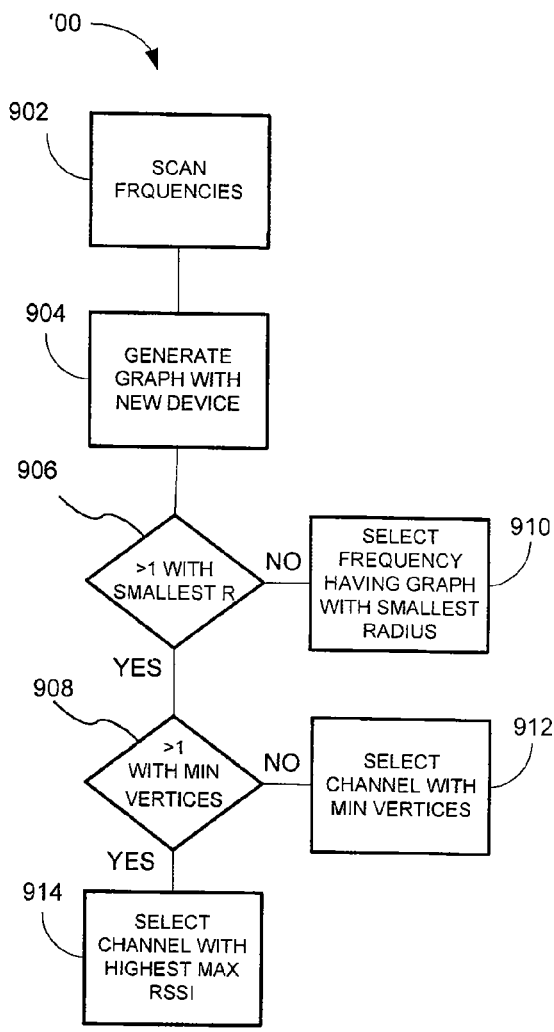
FIG. 8
FIG. 9

DISTRIBUTED CHANNEL ASSIGNMENT

TECHNICAL FIELD

The present disclosure relates generally to wireless communications.

BACKGROUND

The Institute of Electrical and Electronics Engineers (IEEE) through the 802.11 standard is in the process of implementing a new amendment (802.11aa) for improving video performance, even in the presence of overlapping access points (APs) and their associated clients known as Basic Service Sets (BSSs) without a central controller (for example in an apartment complex or suburban home environment). Video has very low Packet Loss Requirements (PLR), ranging from 0.5% to 0.001% depending on the codec, error concealment, and desired quality of the rendered video.

Video has a very low Packet Loss Requirements (PLR), for example presently ranging from 0.5% to 0.001% depending on the codec, error concealment and desired quality of the rendered video. Techniques such as Enhanced Distributed Channel Access (EDCA) and Request to Send/Clear to Send (RTS/CTS) can be employed to alleviate packet loss. These techniques, however, may not be able to consistently provide the PLR required for video for long periods of time (for example 30 minutes while watching a television show), especially in the presence of busy traffic also contending for the medium.

BRIEF DESCRIPTION OF THE DRAWINGS

The accompanying drawings incorporated herein and forming a part of the specification illustrate the examples embodiments.

FIG. 8 illustrates an example methodology for selecting a channel based on minimal maximum signal strength between the wireless device whose channel is being selected and neighboring wireless devices when more than one connectivity graph has the minimum radius and lowest number of vertices.

FIG. 9 illustrates an example methodology for selecting a channel based on maximal maximum signal strength between the wireless device whose channel is being selected and neighboring wireless devices when more than one connectivity graph has the minimum radius and lowest number of vertices.

OVERVIEW OF EXAMPLE EMBODIMENTS

Figure 1:
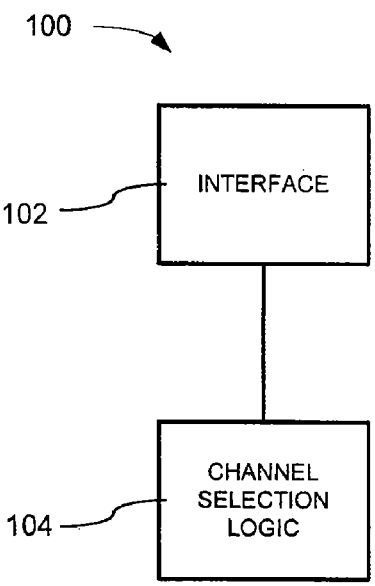
FIG. 1 illustrates an example apparatus configured in accordance with an example embodiment.

The following presents a simplified overview of the example embodiments in order to provide a basic understanding of some aspects of the example embodiments. This overview is not an extensive overview of the example embodiments. It is intended to neither identify key or critical elements of the example embodiments nor delineate the scope of the appended claims. Its sole purpose is to present some concepts of the example embodiments in a simplified form as a prelude to the more detailed description that is presented later.

In accordance with an example embodiment, there is disclosed herein an apparatus comprising an interface and channel selection logic coupled to the interface. The channel selection logic is operable to receive data representative of neighboring wireless devices to a wireless device occupying a channel for a plurality of channels via the interface. The channel selection logic is responsive to receiving the data representative of neighboring wireless devices occupying the plurality of channels to generate a graph for each of the plurality of channels, wherein vertices of the graph represent the wireless device and neighboring wireless devices occupying the channel and edges of the graph represent wireless devices with overlapping coverage areas. The channel selection logic selects the channel for the wireless device whose graph has the smallest radius.

In accordance with an example embodiment, there is disclosed herein a method comprising obtaining data representative of neighboring wireless devices to a wireless device occupying a channel for a plurality of channels via the interface. A graph is generated for each of the plurality of channels based on the data representative of wireless devices, wherein vertices of the graph represent the wireless device and neighboring wireless devices occupying the channel and edges of the graph represent wireless devices with overlapping coverage areas. A center of the graph is determined for each of the plurality of channels. A connectivity extent of the graph is determined for each of the plurality of channels. A channel is selected from the plurality of channels whose graph has the smallest connectivity extent.

DESCRIPTION OF EXAMPLE EMBODIMENTS

This description provides examples not intended to limit the scope of the appended claims. The figures generally indicate the features of the examples, where it is understood and appreciated that like reference numerals are used to refer to like elements. Reference in the specification to "one embodiment" or "an embodiment" or "an example embodiment" means that a particular feature, structure, or characteristic described is included in at least one embodiment described herein and does not imply that the feature, structure, or characteristic is present in all embodiments described herein.

Disclosed in an example embodiment described herein is a distributed channel selection algorithm with a low inter-wireless device (such as an Access Point "AP") coordination that attempts to minimize the extent of connectivity graphs. A connectivity graph as used herein as an 'island' of wireless devices (such as APs) where every AP can be connected via edges to every other AP. The 'extent' (or connectivity extent) of a connectivity graph is the minimum (across APs in the connectivity graph) of the maximum (across pairs of APs) of the shortest path (between a given pair of APs) or the radius of the graph.

Multiple algorithms are described herein, any of which may be suitable for implementing distributed channel selection. An example of the algorithm framework is as follows:

An AP scans all channels and records the number and RSSIs of all APs per channel, and may also request the connectivity graph of the other APs (e.g. via a predefined Public Action request/response frames) and related parameters The AP selects the best channel according to a first, second (if necessary) and third (if necessary) sort key.

Typical first sort keys are:

1a) Channel with 0 APs;

1b) Channel with minimum connectivity extent (after assigning the AP to that channel); or 1c) Channel with minimum number of APs.

Since there can be a draw after the first sort key is applied, there is a second sort key. Typical second sort keys are:

2a) Channel with minimum number of vertices in the connectivity graph (after assigning the AP to that channel);

2b) Channel with minimum number of edges in the connectivity graph (after assigning the AP to that channel); or 2c) Null (proceed directly to the third sort key).

Since there can be a draw after the second sort key is applied, there is a third sort key. Typical third sort keys are:

3a) Channel with minimum (lowest) maximum (across neighboring APs) RSSI (join the most distant connectivity graph);

3b) Channel with maximum (highest) maximum (across neighboring APs) RSSI (join the nearest connectivity graph)

3c) Channel with lowest sum of RSSIs of APs (in the linear power domain); or

3d) Random.

The connectivity metrics are calculated after adding the AP to that channel as say 2 (or even more) disjoint graphs may become connected by adding the AP. Different algorithms are created by selecting different sort keys. For instance, a basic algorithm is 1a-2c-3a, which tries to find an empty channel, or the channel with most distant APs; however, in accordance with example embodiments that will be described herein, other algorithms may be employed such as: 1b; 1b-2b; 1b-2b-3a; 1b-2b-3b; 1b-3b; 1b-3a; or 1b-3c which tries to find a channel with a minimum connectivity extent.

FIG. 1 illustrates an example apparatus 100 configured in accordance with an example embodiment. Apparatus 100 comprises an interface 102 and channel selection logic 104 coupled to interface 102. "Logic", as used herein, includes but is not limited to hardware, firmware, software and/or combinations of each to perform a function(s) or an action(s), and/or to cause a function or action from another component. For example, based on a desired application or need, logic may include a software controlled microprocessor, discrete logic such as an application specific integrated circuit (ASIC), a programmable/programmed logic device, memory device containing instructions, or the like, or combinational logic embodied in hardware. Logic may also be fully embodied as software.

In an example embodiment, apparatus 100 may be implemented in a device remote from the wireless device for which the channel is being selected. For example, apparatus 100 may be embodied in a radio resource manager (RRM). In these embodiments, interface 102 may be coupled to a distribution network that is coupled to the wireless device and neighboring wireless devices. For example interface 102 may be coupled to an Ethernet network, a Mesh Backhaul network, and/or an Internet. As used herein, a neighboring wireless device is a wireless device whose coverage area overlaps with another wireless device. Whether a wireless device is a neighboring device may depend on predetermined criteria such as signal strength. For example, if a first device receives a second device at a Received Signal Strength Indication (RSSI) of −80 dBm, the second device would be a neighboring device if the specified RSSI (e.g. noise floor) is −85 dBm but would not be a neighboring device if the specified RSSI (noise floor) is −75 dBm.

In an example embodiment, apparatus 100 may be implemented within a wireless device, such as an access point. In this example embodiment, interface 102 is a wireless interface and channel selection logic 104 is operable to select the channel for interface 102.

Channel selection logic 104 is operable to receive data representative of neighboring wireless devices to a wireless device occupying a channel for a plurality of channels via interface 102. Channel selection logic 104 is responsive to receiving the data representative of neighboring wireless devices occupying the plurality of channels to generate a graph for each of the plurality of channels. The vertices of the graph represent the wireless device and neighboring wireless devices occupying the channel and edges of the graph represent wireless devices with overlapping coverage areas.

In an example embodiment, channel selection logic 104 selects the channel for the wireless device whose graph has the smallest radius. Radius may also be referred to herein as the 'connectivity extent' of the graph. The radius of a graph is equal to the eccentricity of those vertices of the graph with minimum eccentricity (the set of vertices having minimal eccentricity are the center of the graph or the points that minimize the maximal distance from other points in the graph).

Figure 2:
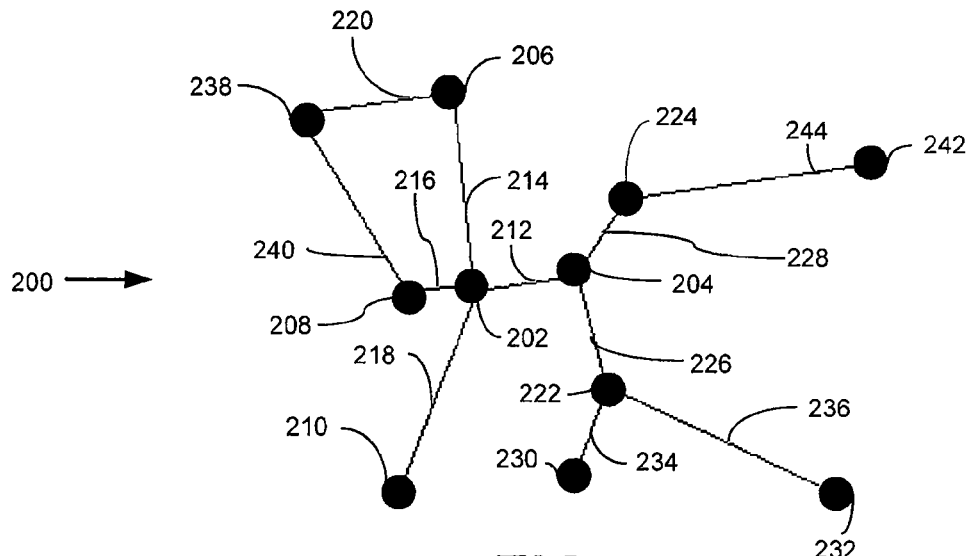
FIG. 2 illustrates an example connectivity graph for a first channel.
Figure 3:
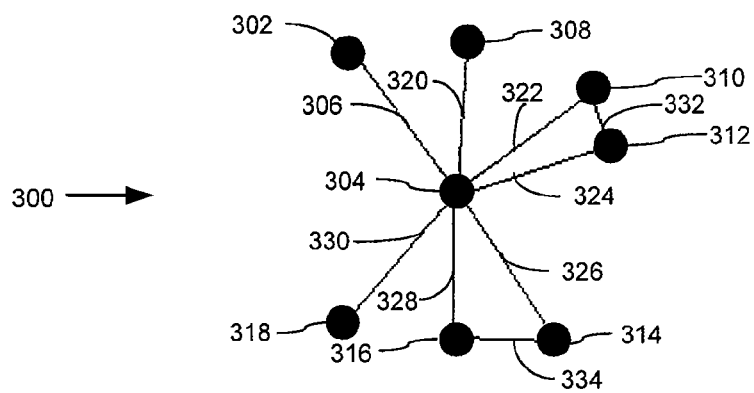
FIG. 3 illustrates an example connectivity graph for a second channel.
Figure 4:
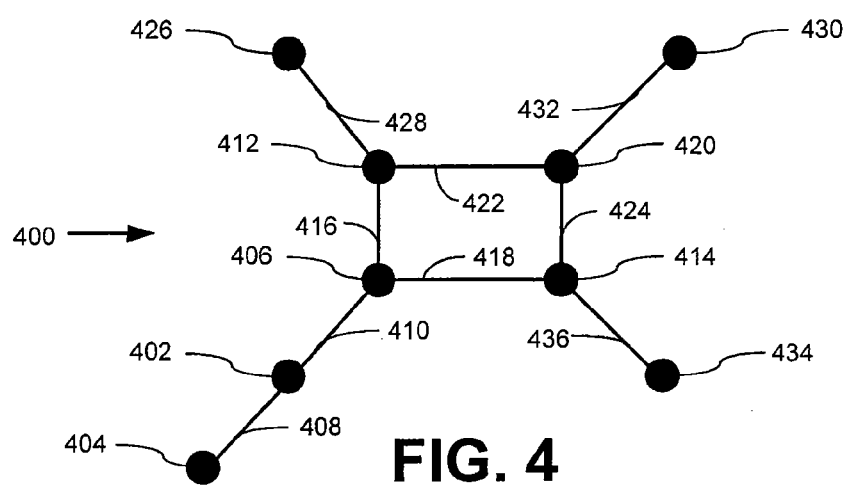
FIG. 4 illustrates an example connectivity graph for a third channel.

For example, referring to FIGS. 2-4, with continued references to FIG. 1, there are illustrated three graphs 200, 300, 400 representing three channels. Graph 200 representing a first channel, graph 300 representing a second channel and graph 400 representing a third channel. Graphs 200, 300, 400 include the wireless device whose channel is being selected. Although FIGS. 2-4 represent three channels, this is merely for ease of illustration as those skilled in the art can readily appreciate that any physically realizable number of channels may be employed by a wireless transceiver; therefore, the example embodiments herein should not be construed to being applicable to only three channels.

For example, graph 200 of FIG. 2 represents neighboring wireless devices and wireless devices within range of the neighboring wireless devices on a first channel. Vertex 202 represents the wireless device whose channel is being selected with reference to the first channel. Vertices 204, 206, 208, 210 represent wireless devices are within range of the wireless device represented by vertices 202, which is illustrated by edges 212, 214, 216 and 218 respectively.

In an example embodiment, control logic 104 obtains the connectivity graphs for neighboring access points represented by vertices 204, 206, 208, 210. As used herein, a 'connectivity graph' is a graph where every vertex can be connected via edges to every other vertex. Based on the connectivity graphs received from the neighboring wireless devices, control logic 104 can ascertain that wireless device represented by vertices 206 overlaps with wireless device represented by vertex 238 as represented by edge 220. Control logic 104 can also determine that the wireless device represented by vertex 238 also overlaps with the wireless device represented by vertex 208 as represented by edge 240. Control logic 104 can also determine from the connectivity graphs that the wireless device represented by vertices 204 overlaps with the wireless devices represented by vertices 222 and 224 as illustrated by edges 226 and 228 respectively. The wireless device represented by vertices 222 also overlaps wireless devices 230 and 232 as represented by edges 234 and 236 respectively. The wireless device represented by vertex 224 overlaps with the wireless device represented by vertex 242 as represented by edge 244.

The example illustrated by graph 200 also illustrates why the wireless device whose channel is being selected should be included in a graph. For example, removing vertices 202 results in the graph in FIG. 2 being represented with three graphs, one with vertices 206, 238, 208 (having a radius or connectivity extent of 1 with vertex 238 being the center of the graph), one with vertex 210 (by itself and having a radius or connectivity extent of 0), and one with vertices 204, 222, 224, 230, 232 and 242 (where vertex 204 is the center of the graph having a radius or connectivity of two). The addition of the wireless device represented by vertices 202 results in a connectivity graph having eleven vertices and a radius (or connectivity extent) of 3 where the center of the graph is the set of vertices 202, 204.

In FIG. 3, vertex 302 represents the wireless device whose operating channel is being selected. The wireless device represented by vertex 302 overlaps the wireless device represented by vertex 304 as illustrated by edge 306. The wireless devices represented by vertices 308, 310, 312, 314, 316, 318 also overlap the wireless device represented by vertex 302 as illustrated by edges 320, 322, 324, 326, 328, 330 respectively. In addition, the wireless devices represented by vertices 310, 312 overlap as illustrated by edge 332 and wireless devices represented by vertices 314, 316 overlap as illustrated by edge 334. In this example, the addition of the wireless device represented by vertex 302 does not change the radius of graph 300, which remains at one.

In FIG. 4, vertex 402 represents the wireless device whose operating channel is being selected. Wireless devices represented by vertices 404, 406 are neighboring wireless devices as represented by edges 408, 410 respectively. Vertices 412 and 414 represent other neighboring devices to the wireless device represented by vertex 406 as illustrated by edges 416, 418 respectively. Vertices 406, 420, 426 represent wireless devices overlapping wireless device represented by vertex 412 as illustrated by edges 416, 422, 428 respectively. Vertices 412, 414, 430 represent wireless devices overlapping the wireless device represented by vertex 420 as illustrated by edges 422, 424 and 432 respectively. Vertices 406, 420 and 434 represent wireless devices overlapping the wireless device represented by vertex 414 as represented by edges 418, 424 and 436 respectively. The addition of the wireless device represented by 402 increases the radius (connectivity extent) of the graph from two to three. Also, vertex 404 is also added to the graph as the graph because of the addition of vertex 402. Before the addition of vertex 402, the center of the graph is vertex 420 and the connectivity extent is two, whereas after the addition of vertex 402, the center of the graph is the set of vertices 412, 414, 406 and the connectivity extent is three.

In an example embodiment, control logic 104 selects the channel with the minimum radius or connectivity extent, which from the examples illustrated in FIGS. 2-4 would be channel 2 (FIG. 3). The channel represented by graph 300 in FIG. 3 has a radius of one whereas the channels represented by FIGS. 2 and 4 have a radius (connectivity extent) of three.

In accordance with example embodiments illustrated herein, if more than one graph has the lowest radius, then additional criteria may be employed to select the operating channel of the wireless device. For example, if channel two (represented by graph 300) is unavailable, then one of the first channel and third channel represented by graphs 200 (FIG. 2) and 400 (FIG. 3) respectively, which have the same radius, would be selected based on additional selection criteria.

In an example embodiment, control logic 104 is wherein responsive to more than one graph having the smallest radius, to select the channel whose graph has a minimum number of vertices from the channels whose graph has the smallest radius. In the examples illustrated, graph 200 (FIG. 2) has eleven vertices and graph 400 (FIG. 4) has nine vertices; therefore, in this example the control logic 104 would select channel three based on graph 400 (FIG. 4) having the lowest number of vertices.

In particular embodiments, if the graphs having the smallest radius also have the same number of vertices then additional criteria can be employed to select the channel. For the following examples assume that vertex 224 in FIG. 2 disconnects from the network (e.g. changes to another (e.g. fourth) channel or powers down), thus vertex 242 which is on the graph because it is connected via edge 244 to vertex 224 would no longer be on graph 200, which would now have nine vertices like graph 400 (FIG. 4). In an example embodiment, data representative of signal strength (such as received signal strength indication "RSSI") is acquired for neighboring wireless devices to the wireless device whose operating channel is being selected.

To illustrate by example, if in FIG. 2 the wireless device whose channel being selected is represented by vertex 202, the neighboring wireless devices are represented by vertices 204, 206, 208, 210. In FIG. 4, the wireless devices whose channel is being selected is represented by vertex 402, therefore, the neighboring wireless devices are represented by vertices 404 and 406. In one example embodiment, control logic 104 is further configured to select a channel having a maximal maximum signal strength between the wireless device and neighboring wireless devices from the channels whose graph have the smallest radius and minimum number of vertices. For example, if the RSSI of neighboring wireless devices on the first channel to the wireless device represented by vertex 202, which are 204, 206, 208, 210 are −30, −60, −70, −80 (dBm) respectively, and the RSSI of neighboring wireless devices on the third channel to the wireless device represented by vertex 402, which are 404, 406, are −50 and −90 (dBm), the maximum signal strength of the first channel is −30 dBm and the maximum signal strength of the third channel is −50 dBm, control logic 104 would select the first channel because channel it has the maximal (highest) maximum signal strength (−30 dBm>−50 dBm).

In other example embodiment, if the graphs having the smallest radius also have the same number of vertices, control logic 104 is configured to select a channel having a minimal maximum signal strength between the wireless device and neighboring wireless devices from the channels whose graph have the smallest radius and minimum number of vertices. For example, if the RSSI of neighboring wireless devices on a first channel to the wireless device represented by vertex 202, which are 204, 206, 208, 210 are −30, −60, −70, −80 (dBm) respectively, and the RSSI of neighboring wireless devices on a third channel to the wireless device represented by vertex 402, which are 404, 406, are −50 and −90 (dBm), the maximum signal strength of channel one is −30 dBm and the maximum signal strength of channel three is −50 dBm; therefore, control logic 104 would select the third channel because channel it has the minimal (lowest) maximum signal strength (−50 dBm<−30 dBm).

In an example embodiment, if more than one graph has the smallest radius, control logic 104 selects a channel associated with the more than one graph that has a minimal maximum signal strength between the wireless device and neighboring wireless devices from the channels whose graph have the smallest radius. For example, if the RSSI of neighboring wireless devices on the first channel to the wireless device represented by vertex 202, which are 204, 206, 208, 210 are −30, −60, −70, −80 (dBm) respectively, and the RSSI of neighboring wireless devices on the third channel to the wireless device represented by vertex 402, which are 404, 406, are −50 and −90 (dBm), the maximum signal strength of the first channel is −30 dBm and the maximum signal strength of the third channel is −50 dBm, control logic 104 would select the third channel because channel it has the lower maximum signal strength (−50 dBm<−30 dBm). In another example embodiment, control logic 104 selects the channel having the maximal maximum signal strength which from the above example would be the first channel (−30 dBm>−50 dBm). In another example embodiment, if more than one graph has the smallest radius, control logic 104 selects a channel randomly.

In an example embodiment, if more than one graph has the smallest radius, control logic 104 is further configured to select one of the channels having the smallest radius whose graph has a minimum number of edges. For example, if selecting between the channel associated with graph 200 in FIG. 2 and the channel associated with graph 400 in FIG. 4, control logic 104 would select the channel associated with graph 400 as it has less edges (9 edges) than graph 200 (11 edges).

Figure 5:
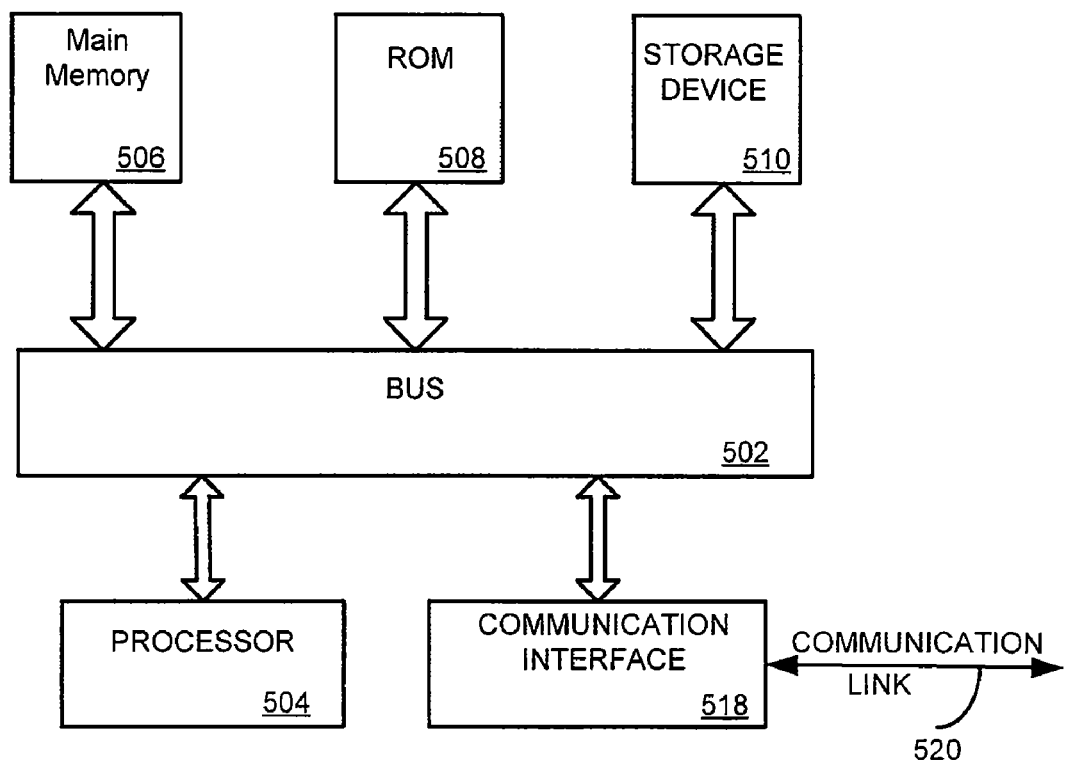
FIG. 5 illustrates an example of a computer system upon which an example embodiment may be implemented.

FIG. 5 illustrates an example of a computer system 500 upon which an example embodiment may be implemented. For example, computer system 500 may be employed to implement logic 104 (FIG. 1).

Computer system 500 includes a bus 502 or other communication mechanism for communicating information and a processor 504 coupled with bus 502 for processing information. Computer system 500 also includes a main memory 506, such as random access memory (RAM) or other dynamic storage device coupled to bus 502 for storing information and instructions to be executed by processor 504. Main memory 506 also may be used for storing a temporary variable or other intermediate information during execution of instructions to be executed by processor 504. Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

An aspect of the example embodiment is related to the use of computer system 500 for distributed channel assignment. According to an example embodiment, distributed channel assignment is provided by computer system 500 in response to processor 504 executing one or more sequences of one or more instructions contained in main memory 506. Such instructions may be read into main memory 506 from another computer-readable medium, such as storage device 510. Execution of the sequence of instructions contained in main memory 506 causes processor 504 to perform the process steps described herein. One or more processors in a multi-processing arrangement may also be employed to execute the sequences of instructions contained in main memory 506. In alternative embodiments, hard-wired circuitry may be used in place of or in combination with software instructions to implement an example embodiment. Thus, embodiments described herein are not limited to any specific combination of hardware circuitry and software.

The term "computer-readable medium" as used herein refers to any medium that participates in providing instructions to processor 504 for execution. Such a medium may take many forms, including but not limited to non-volatile media, and volatile media. Non-volatile media include for example optical or magnetic disks, such as storage device 510. Volatile media include dynamic memory such as main memory 506. Common forms of computer-readable media include for example floppy disk, a flexible disk, hard disk, magnetic cards, paper tape, any other physical medium with patterns of holes, a RAM, a PROM, an EPROM, a FLASHPROM, CD, DVD or any other memory chip or cartridge, or any other medium from which a computer can read.

Computer system 500 also includes a communication interface 518 coupled to bus 502. Communication interface 518 provides a two-way data communication coupling computer system 500 to other devices (not shown). Communication link 520 may be a wired connection in which case communication interface 518 can employ a wired networking protocol (such as Ethernet), or communication link 520 may be a wireless link (e.g. Radio Frequency "RF", optical, and/or infrared "IR") in which case communication interface 518 would be configured to receive such wireless signals and employ a wireless protocol such as the Institute of Electrical and Electronics Engineers (IEEE) 802.11 protocol.

In view of the foregoing structural and functional features described above, methodologies in accordance with example embodiments will be better appreciated with reference to FIGS. 6-13. While, for purposes of simplicity of explanation, the methodologies of FIGS. 6-13 are shown and described as executing serially, it is to be understood and appreciated that the example embodiments are not limited by the illustrated order, as some aspects could occur in different orders and/or concurrently with other aspects shown and described herein. Moreover, not all illustrated features may be required to implement the illustrated methodology. The methodologies described herein are suitably adapted to be implemented in hardware, software, or a combination thereof. Moreover, any of methodologies described in FIGS. 6-13 can be implemented by control logic 104 (FIG. 1) and/or computer system 500 (FIG. 5).

Figure 6:
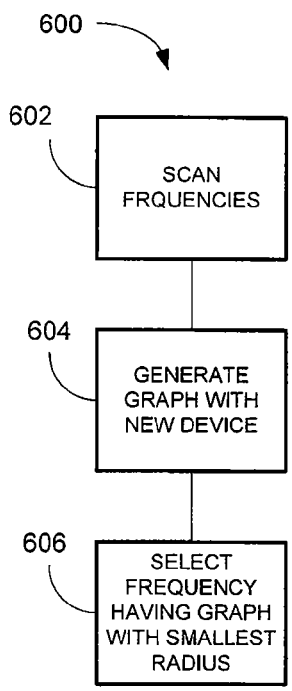
FIG. 6 illustrates an example methodology for selecting a channel based on the radius of connectivity graphs.

FIG. 6 illustrates an example methodology 600 for selecting a channel based on the radius of connectivity graphs. At 602, a plurality of channels (frequencies) are scanned by a wireless device (such as an access point or "AP") to obtain data representative of neighboring wireless devices (APs) occupying each channel. The data may include signal strength (such as received signal strength indication or "RSSI"). In particular embodiments, connectivity graph data may be obtained from neighboring wireless devices.

At 604, a graph is generated for each of the plurality of channels based on the data representative of wireless devices. The vertices of the graph represent the wireless device and neighboring wireless devices occupying the channel. The edges of the graph represent wireless devices with overlapping coverage areas. In an example embodiment, graphical analysis is performed to determine a center of the graph for each of the plurality of channels. The center can be determined by finding the set of vertices having the minimum eccentricity.

At 606, the radius (or connectivity extent) of the graph is determined for each of the plurality of channels. The channel (frequency whose graph has the smallest radius is selected.

Figure 7:
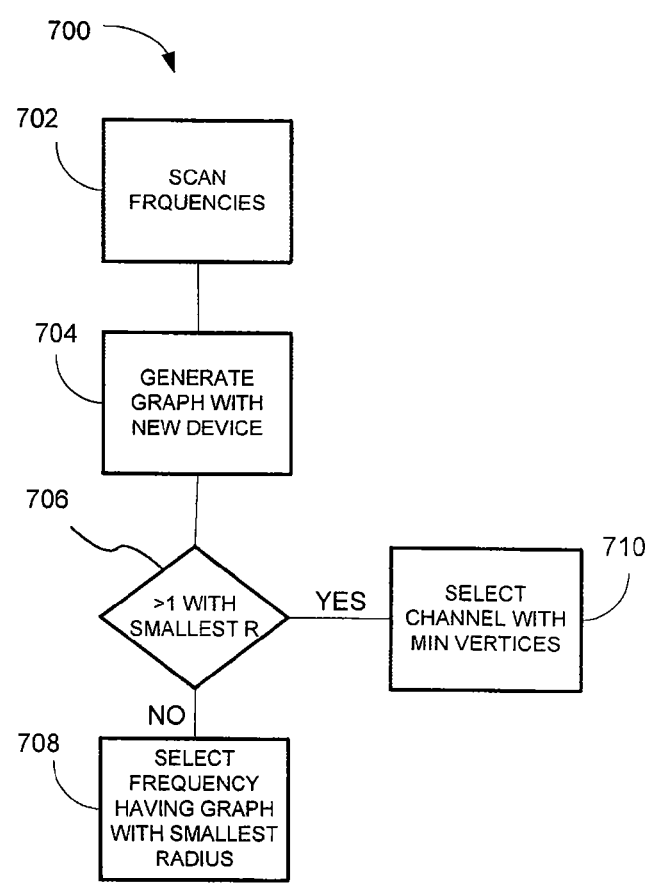
FIG. 7 illustrates an example methodology for selecting a channel based on the number vertices when more than one connectivity graph has the minimum radius.

FIG. 7 illustrates an example methodology 700 for selecting a channel based on the number of vertices when more than one connectivity graph has the minimum radius. At 702, a plurality of channels (frequencies) are scanned by a wireless device (such as an access point or "AP") to obtain data representative of neighboring wireless devices (APs) occupying each channel. The data may include signal strength (such as received signal strength indication or "RSSI"). In particular embodiments, connectivity graph data may be obtained from neighboring wireless devices.

At 704, a graph is generated for each of the plurality of channels based on the data representative of wireless devices. The vertices of the graph represent the wireless device and neighboring wireless devices occupying the channel. The edges of the graph represent wireless devices with overlapping coverage areas. In an example embodiment, graphical analysis is performed to determine a center of the graph for each of the plurality of channels. The center can be determined by finding the set of vertices having the minimum eccentricity.

At 706, the radius (or connectivity extent) of the graph is determined for each of the plurality of channels. If more than one graph has the smallest (same) connectivity extent (YES), at 710, the channel is selected having the graph with the smallest connectivity extent and the lowest number of vertices. If at 706, only one graph has the lowest connectivity extent (NO), at 708 the channel corresponding to the graph having the smallest radius is selected.

FIG. 8 illustrates an example methodology 800 for selecting a channel based on minimal maximum signal strength between the wireless device whose channel is being selected and neighboring wireless devices when more than one connectivity graph has the minimum radius and lowest number of vertices. At 802, a plurality of channels (frequencies) are scanned by a wireless device (such as an access point or "AP") to obtain data representative of neighboring wireless devices (APs) occupying each channel. The data may include signal strength (such as received signal strength indication or "RSSI"). In particular embodiments, connectivity graph data may be obtained from neighboring wireless devices.

At 804, a graph is generated for each of the plurality of channels based on the data representative of wireless devices. The vertices of the graph represent the wireless device and neighboring wireless devices occupying the channel. The edges of the graph represent wireless devices with overlapping coverage areas. In an example embodiment, graphical analysis is performed to determine a center of the graph for each of the plurality of channels. The center can be determined by finding the set of vertices having the minimum eccentricity.

At 806, the radius (or connectivity extent) of the graph is determined for each of the plurality of channels. If only one graph has the smallest (same) connectivity extent (No), at 810, the channel is selected having the graph with the smallest connectivity extent.

If, at 806, more than one graph has the (same) lowest connectivity extent (YES), at 808 the number of vertices for each graph is determined, and a determination is made for how many of the graphs with the smallest connectivity extent have the minimum number of vertices. If at 808, only one of the graphs having the smallest connectivity has the minimum number of vertices (NO), at 812 the channel is selected corresponding to the graph having the minimum number of vertices.

If, at 808, more than one graph with the smallest connectivity extent also have the minimum number of vertices (YES), at 814 the signal strengths (e.g. RSSI) of signals between the wireless device whose channel is being selected and neighboring wireless devices are analyzed. For example, if the RSSI of neighboring wireless devices on the first channel to the wireless device are −30, −60, −70, −80 (dBm), and the RSSI of neighboring wireless devices on a second channel are −50 and −90 (dBm), the maximum signal strength of the first channel is −30 dBm and the maximum signal strength of the second channel is −50 dBm. The second is selected because channel it has the lower (minimal) maximum signal strength (−50 dBm<−30 dBm).

FIG. 9 illustrates an example methodology 900 for selecting a channel based on maximal maximum signal strength between the wireless device whose channel is being selected and neighboring wireless devices when more than one connectivity graph has the minimum radius and lowest number of vertices. At 902, a plurality of channels (frequencies) are scanned by a wireless device (such as an access point or "AP") to obtain data representative of neighboring wireless devices (APs) occupying each channel. The data may include signal strength (such as received signal strength indication or "RSSI"). In particular embodiments, connectivity graph data may be obtained from neighboring wireless devices.

At 904, a graph is generated for each of the plurality of channels based on the data representative of wireless devices. The vertices of the graph represent the wireless device and neighboring wireless devices occupying the channel. The edges of the graph represent wireless devices with overlapping coverage areas. In an example embodiment, graphical analysis is performed to determine a center of the graph for each of the plurality of channels. The center can be determined by finding the set of vertices having the minimum eccentricity.

At 906, the radius (or connectivity extent) of the graph is determined for each of the plurality of channels. If only one graph has the smallest (same) connectivity extent (No), at 910, the channel is selected having the graph with the smallest connectivity extent.

If, at 906, more than one graph has the (same) lowest connectivity extent (YES), at 908 the number of vertices for each graph is determined, and a determination is made for how many of the graphs with the smallest connectivity extent have the minimum number of vertices. If at 908, only one of the graphs having the smallest connectivity has the minimum number of vertices (NO), at 912 the channel is selected corresponding to the graph having the minimum number of vertices.

If, at 908, more than one graph with the smallest connectivity extent also have the minimum number of vertices (YES), at 914 the signal strengths (e.g. RSSI) of signals between the wireless device whose channel is being selected and neighboring wireless devices are analyzed. For example, if the RSSI of neighboring wireless devices on the first channel to the wireless device are −30, −60, −70, −80 (dBm), and the RSSI of neighboring wireless devices on a second channel are −50 and −90 (dBm), the maximum signal strength of the first channel is −30 dBm and the maximum signal strength of the second channel is −50 dBm. The first is selected because channel it has the higher (maximal) maximum signal strength (−30 dBm>−50 dBm).

Figure 10:
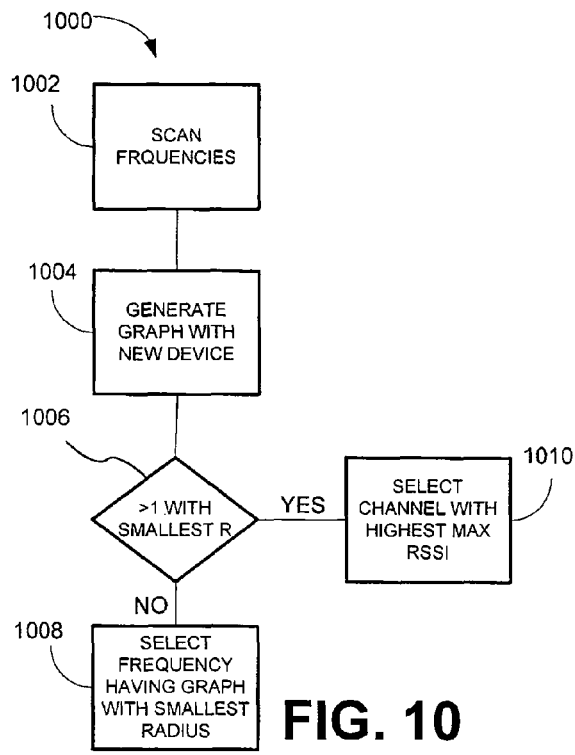
FIG. 10 illustrates an example methodology for selecting a channel based on maximal maximum signal strength between the wireless device whose channel is being selected and neighboring wireless devices when more than one connectivity graph has the minimum radius.

FIG. 10 illustrates an example methodology 1000 for selecting a channel based on maximal maximum signal strength between the wireless device whose channel is being selected and neighboring wireless devices when more than one connectivity graph has the minimum radius. At 1002, a plurality of channels (frequencies) are scanned by a wireless device (such as an access point or "AP") to obtain data representative of neighboring wireless devices (APs) occupying each channel. The data may include signal strength (such as received signal strength indication or "RSSI"). In particular embodiments, connectivity graph data may be obtained from neighboring wireless devices.

At 1004, a graph is generated for each of the plurality of channels based on the data representative of wireless devices. The vertices of the graph represent the wireless device and neighboring wireless devices occupying the channel. The edges of the graph represent wireless devices with overlapping coverage areas. In an example embodiment, graphical analysis is performed to determine a center of the graph for each of the plurality of channels. The center can be determined by finding the set of vertices having the minimum eccentricity.

At 1006, the radius (or connectivity extent) of the graph is determined for each of the plurality of channels. If only one graph has the smallest (same) connectivity extent (No), at 1008, the channel is selected having the graph with the smallest connectivity extent.

If, at 1006, more than one graph has the (same) lowest connectivity extent (YES), at 1010 the signal strengths (e.g. RSSI) of signals between the wireless device whose channel is being selected and neighboring wireless devices are analyzed. For example, if the RSSI of neighboring wireless devices on the first channel to the wireless device are −30, −60, −70, −80 (dBm), and the RSSI of neighboring wireless devices on a second channel are −50 and −90 (dBm), the maximum signal strength of the first channel is −30 dBm and the maximum signal strength of the second channel is −50 dBm. The firsts selected because channel it has the higher (maximal) maximum signal strength (−30 dBm>−50 dBm).

Figure 11:
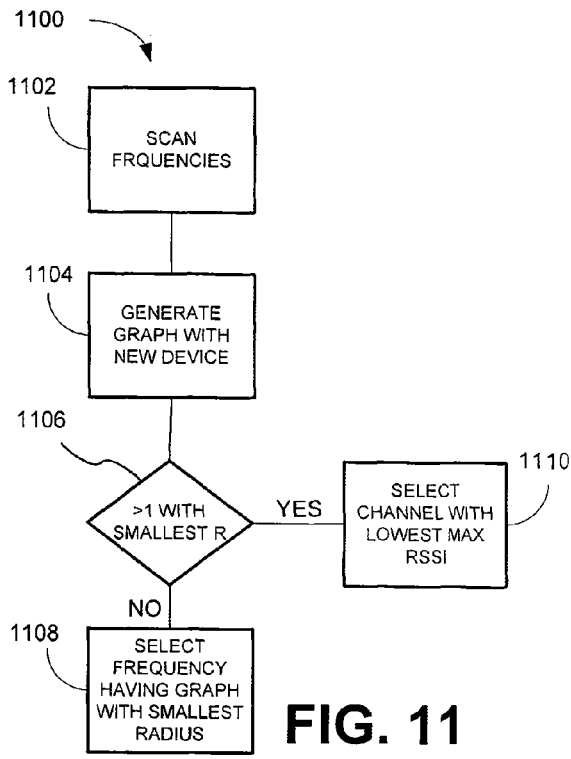
FIG. 11 illustrates an example methodology for selecting a channel based on minimal maximum signal strength between the wireless device whose channel is being selected and neighboring wireless devices when more than one connectivity graph has the minimum radius.

FIG. 11 illustrates an example methodology 1100 for selecting a channel based on minimal maximum signal strength between the wireless device whose channel is being selected and neighboring wireless devices when more than one connectivity graph has the minimum radius. At 1102, a plurality of channels (frequencies) are scanned by a wireless device (such as an access point or "AP") to obtain data representative of neighboring wireless devices (APs) occupying each channel. The data may include signal strength (such as received signal strength indication or "RSSI"). In particular embodiments, connectivity graph data may be obtained from neighboring wireless devices.

At 1104, a graph is generated for each of the plurality of channels based on the data representative of wireless devices. The vertices of the graph represent the wireless device and neighboring wireless devices occupying the channel. The edges of the graph represent wireless devices with overlapping coverage areas. In an example embodiment, graphical analysis is performed to determine a center of the graph for each of the plurality of channels. The center can be determined by finding the set of vertices having the minimum eccentricity.

At 1106, the radius (or connectivity extent) of the graph is determined for each of the plurality of channels. If only one graph has the smallest (same) connectivity extent (No), at 1108, the channel is selected having the graph with the smallest connectivity extent.

If, at 1106, more than one graph has the (same) lowest connectivity extent (YES), at 1110 the signal strengths (e.g. RSSI) of signals between the wireless device whose channel is being selected and neighboring wireless devices are analyzed. For example, if the RSSI of neighboring wireless devices on the first channel to the wireless device are −30, −60, −70, −80 (dBm), and the RSSI of neighboring wireless devices on a second channel are −50 and −90 (dBm), the maximum signal strength of the first channel is −30 dBm and the maximum signal strength of the second channel is −50 dBm. The second is selected because channel it has the lower (minimal) maximum signal strength (−50 dBm<−30 dBm).

Figure 12:
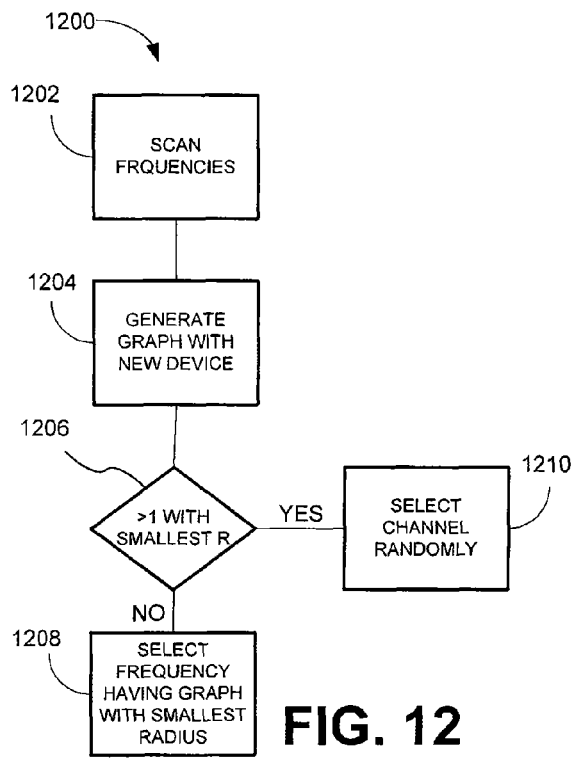
FIG. 12 illustrates an example methodology for selecting a channel when more than one based on the connectivity graphs has the smallest radius by randomly selecting one of the channels corresponding to the connectivity graphs having the smallest radius.

FIG. 12 illustrates an example methodology 1200 for selecting a channel when more than one based on the connectivity graphs has the smallest radius by randomly selecting one of the channels corresponding to the connectivity graphs having the smallest radius. At 1202, a plurality of channels (frequencies) are scanned by a wireless device (such as an access point or "AP") to obtain data representative of neighboring wireless devices (APs) occupying each channel. The data may include signal strength (such as received signal strength indication or "RSSI"). In particular embodiments, connectivity graph data may be obtained from neighboring wireless devices.

At 1204, a graph is generated for each of the plurality of channels based on the data representative of wireless devices. The vertices of the graph represent the wireless device and neighboring wireless devices occupying the channel. The edges of the graph represent wireless devices with overlapping coverage areas. In an example embodiment, graphical analysis is performed to determine a center of the graph for each of the plurality of channels. The center can be determined by finding the set of vertices having the minimum eccentricity.

At 1206, the radius (or connectivity extent) of the graph is determined for each of the plurality of channels. If only one graph has the smallest (same) connectivity extent (NO), at 1208, the channel is selected having the graph with the smallest connectivity extent.

If, at 1206, more than one graph has the (same) lowest connectivity extent (YES), at 1210 a channel is randomly selected from the graphs having the lowest connectivity extent. Any suitable random selection technique may be employed. For example a pseudorandom number generator may be employed (e.g. if two graphs remain, if the pseudorandom number is below a predetermined value the channel associated with the first graph is selected whereas if the pseudorandom number is greater than or equal to the predetermined value the channel associated with the second graph is selected, etc.).

Figure 13:
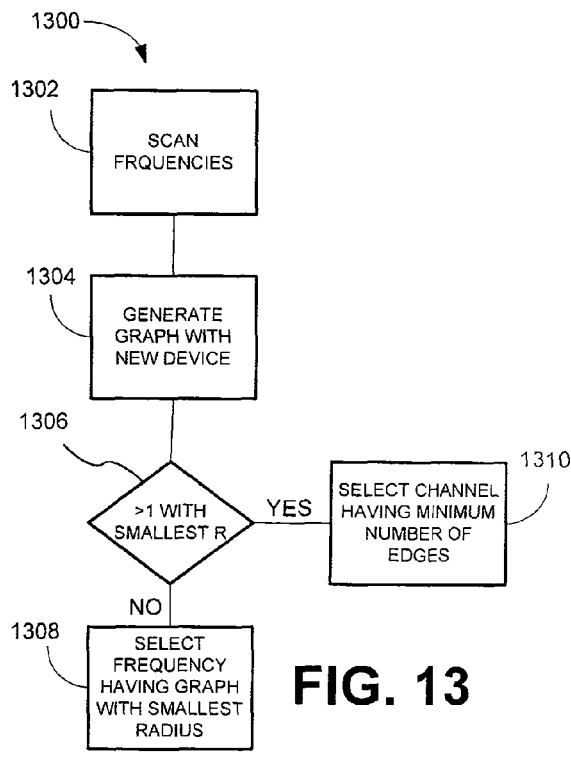
FIG. 13 illustrates an example methodology for selecting a channel based on the number edges when more than one connectivity graph has the minimum radius.

FIG. 13 illustrates an example methodology 1300 for selecting a channel based on the number of edges when more than one connectivity graph has the minimum radius. At 1302, a plurality of channels (frequencies) are scanned by a wireless device (such as an access point or "AP") to obtain data representative of neighboring wireless devices (APs) occupying each channel. The data may include signal strength (such as received signal strength indication or "RSSI"). In particular embodiments, connectivity graph data may be obtained from neighboring wireless devices.

At 1304, a graph is generated for each of the plurality of channels based on the data representative of wireless devices. The vertices of the graph represent the wireless device and neighboring wireless devices occupying the channel. The edges of the graph represent wireless devices with overlapping coverage areas. In an example embodiment, graphical analysis is performed to determine a center of the graph for each of the plurality of channels. The center can be determined by finding the set of vertices having the minimum eccentricity.

At 1306, the radius (or connectivity extent) of the graph is determined for each of the plurality of channels. If only one graph has the smallest (same) connectivity extent (NO), at 1308, the channel is selected having the graph with the smallest connectivity extent. If, at 1306, more than one graph has the (same) lowest connectivity extent (YES), at 1310 the channel is selected that has the graph with the smallest connectivity extent and the lowest number of edges.

Described above are example embodiments. It is, of course, not possible to describe every conceivable combination of components or methodologies, but one of ordinary skill in the art will recognize that many further combinations and permutations of the example embodiments are possible. Accordingly, this application is intended to embrace all such alterations, modifications and variations that fall within the spirit and scope of the appended claims interpreted in accordance with the breadth to which they are fairly, legally and equitably entitled.

The invention claimed is:

1. An apparatus, comprising:
an interface; and
channel selection logic coupled to the interface;
wherein the channel selection logic is operable to receive data representative of neighboring wireless devices to a wireless device occupying a channel for a plurality of channels via the interface;
wherein the channel selection logic is responsive to receiving the data representative of neighboring wireless devices occupying the plurality of channels to generate a graph for each of the plurality of channels, wherein vertices of the graph represent the wireless device and neighboring wireless devices occupying the channel and edges of the graph represent wireless devices with overlapping coverage areas; and
wherein the channel selection logic selects the channel for the wireless device whose graph has the smallest radius.

2. The apparatus set forth in claim 1, wherein responsive to more than one graph having the smallest radius, the control logic is further configured to select the channel whose graph has a minimum number of vertices from the channels whose graph have the smallest radius.

3. The apparatus set forth in claim 2, wherein responsive to more than one graph having the smallest radius and minimum number of vertices, the control logic is further configured to select a channel having a maximal maximum signal strength between the wireless device and neighboring wireless devices from the channels whose graph have the smallest radius and minimum number of vertices.

4. The apparatus set forth in claim 2, wherein responsive to more than one graph having the smallest radius and minimum number of vertices, the control logic is further configured to select a channel having a minimal maximum signal strength between the wireless device and neighboring wireless devices from the channels whose graph have the smallest radius and minimum number of vertices.

5. The apparatus set forth in claim 1, wherein responsive to more than one graph having the smallest radius, the control logic is further configured to select a channel having a maximal maximum signal strength between the wireless device and neighboring wireless devices from the channels whose graph have the smallest radius.

6. The apparatus set forth in claim 1, wherein responsive to more than one graph having the smallest radius, the control logic is further configured to select a channel having a minimal maximum signal strength between the wireless device and neighboring wireless devices from the channels whose graph have the smallest radius.

7. The apparatus set forth in claim 1, wherein responsive to more than one graph having the smallest radius, the control logic is further configured to randomly select one of the channels whose graph has the smallest radius.

8. The apparatus set forth in claim 1, wherein responsive to more than one graph having the smallest radius, the control logic is further configured to select one of the channels having the smallest radius whose graph has a minimum number of edges.

9. The apparatus set forth in claim 1, wherein the wireless device and neighboring wireless device select an algorithm for selecting the channel, the algorithm selected from a group consisting of selecting a channel whose graph has the smallest radius and minimum number of vertices; selecting a channel whose graph has the smallest radius, minimum number of vertices and maximal maximum signal strength between the wireless device and neighboring wireless devices; selecting a channel whose graph has the smallest radius, minimum number of vertices and minimal maximum signal strength between the wireless device and neighboring wireless devices; selecting a channel whose graph has the smallest radius and maximal maximum signal strength between the wireless device and neighboring wireless devices; and selecting a channel whose graph has the smallest radius and minimal maximum signal strength between the wireless device and neighboring wireless devices.

10. The apparatus set forth in claim 1, wherein the interface is a wireless interface; and
wherein the control logic is configured to have the wireless interface scan the plurality of channels and measure received signal strength indication for neighboring wireless devices found on each channel.

11. The apparatus set forth in claim 10, wherein the control logic is further configured to obtain a connectivity graph from the wireless devices found on each channel via the wireless interface.

12. The apparatus set forth in claim 1, wherein the interface is coupled to a distribution network that is coupled to the neighboring wireless devices; and
wherein the data representative of neighboring wireless devices to a wireless device occupying a channel for a plurality of channels via the interface is acquired from the wireless device and from the neighboring wireless devices.

13. The apparatus set forth in claim 1, wherein the interface is a wireless interface associated with the wireless device; and
wherein the data representative of neighboring wireless devices occupying the plurality of channels is obtained via the wireless interface.

14. A method, comprising:
obtaining data representative of neighboring wireless devices to a wireless device occupying a channel for a plurality of channels via the interface;
generating a graph for each of the plurality of channels based on the data representative of wireless devices, wherein vertices of the graph represent the wireless device and neighboring wireless devices occupying the channel and edges of the graph represent wireless devices with overlapping coverage areas;
determining a center of the graph for each of the plurality of channels;

determining a connectivity extent of the graph for each of the plurality of channels; and selecting the channel from the plurality of channels whose graph has the smallest connectivity extent.

15. The method of claim 14, further comprising obtaining a connectivity graph from the neighboring wireless devices.

16. The method of claim 14, wherein at least two graphs have the smallest connectivity extent, the method further comprising selecting a channel whose graph has a minimum number of vertices from the at least two graphs.

17. The method of claim 14, wherein at least two graphs have the smallest connectivity extent and a minimum number of vertices, the method further comprising selecting a channel having a maximal maximum signal strength between the wireless device and neighboring wireless devices from the channels associated with the at least two graphs.

18. The method of claim 14, wherein at least two graphs have the smallest connectivity extent and a minimum number of vertices, the method further comprising selecting a channel having a minimal maximum signal strength between the wireless device and neighboring wireless devices from the channels associated with the at least two graphs.

19. The method of claim 14, wherein at least two graphs have the smallest connectivity extent, the method further comprising selecting a channel having a maximal maximum signal strength between the wireless device and neighboring wireless devices from the channels associated with the at least two graphs.

20. The method of claim 14, wherein at least two graphs have the smallest connectivity extent, the method further comprising selecting a channel having a minimal maximum signal strength between the wireless device and neighboring wireless devices from the channels associated with the at least two graphs.

\* \* \* \* \*